United States Patent
Foglia

(10) Patent No.: US 11,470,995 B2
(45) Date of Patent: Oct. 18, 2022

(54) SYSTEM FOR DETECTING A FILTER HOLDER IN A DISPENSING ASSEMBLY OF A COFFEE MACHINE

(71) Applicant: SIMONELLI GROUP S.P.A., Belforte del Chienti (IT)

(72) Inventor: Simone Foglia, Macerata (IT)

(*) Notice: Subject to any disclaimer, the term of this patent is extended or adjusted under 35 U.S.C. 154(b) by 501 days.

(21) Appl. No.: 16/611,591

(22) PCT Filed: May 28, 2018

(86) PCT No.: PCT/EP2018/063967
§ 371 (c)(1),
(2) Date: Nov. 7, 2019

(87) PCT Pub. No.: WO2018/219883
PCT Pub. Date: Dec. 6, 2018

(65) Prior Publication Data
US 2020/0154935 A1    May 21, 2020

(30) Foreign Application Priority Data
May 30, 2017 (IT) .......................... 102017000058702

(51) Int. Cl.
*A47J 31/44* (2006.01)
*A47J 31/36* (2006.01)
(Continued)

(52) U.S. Cl.
CPC ....... *A47J 31/4464* (2013.01); *A47J 31/0663* (2013.01); *A47J 31/3671* (2013.01); *A47J 31/525* (2018.08); *A47J 31/0684* (2013.01)

(58) Field of Classification Search
CPC ................ A47J 31/4464; A47J 31/3671; A47J 31/0684; A47J 31/525; A47J 31/0663
See application file for complete search history.

(56) References Cited

U.S. PATENT DOCUMENTS 6,044,754 A * 4/2000 Fuentes ............... A47J 31/0668
99/302 R
2016/0143481 A1   5/2016 Merelli
(Continued)

FOREIGN PATENT DOCUMENTS

DE        19640170    * 4/1998
GB        2487069 A     7/2012
WO      2016139571 A1   9/2016

OTHER PUBLICATIONS

English Translation for DE19640170 published Apr. 1998.*
International Search Report for Corresponding PCT/EP2018/063967.
Written Opinion of the ISA for Corresponding PCT/EP2018/063967.

*Primary Examiner* — Anthony J Weier
(74) *Attorney, Agent, or Firm* — Egbert, McDaniel & Swartz, PLLC

(57) ABSTRACT

A system for detecting the presence of a filter holder in a dispensing assembly of a coffee machine includes: a ring with an internal groove, a filter holder with a tab coupled with the groove and a proximity sensor. The groove has a semi-annular shape and is configured in such a way to receive the tab of the filter holder in bayonet coupling mode, wherein the filter holder is translated and rotated. The ring has a rotation stopper suitable for stopping the rotation of the filter holder in the ring in a stop point. The proximity sensor passes through the ring and finishes in the stop point of the groove of the ring.

12 Claims, 4 Drawing Sheets

(51) Int. Cl.
*A47J 31/06* (2006.01)
*A47J 31/52* (2006.01)

(56) References Cited

U.S. PATENT DOCUMENTS

| | | | |
|---|---|---|---|
| 2016/0198887 A1* | 7/2016 | Levi | A47J 31/404 |
| | | | 99/280 |
| 2016/0242590 A1 | 8/2016 | Grassia | |
| 2016/0287005 A1* | 10/2016 | Ceotto | A47J 31/0626 |
| 2017/0119202 A1* | 5/2017 | Ottavi | A47J 31/465 |

* cited by examiner

SYSTEM FOR DETECTING A FILTER HOLDER IN A DISPENSING ASSEMBLY OF A COFFEE MACHINE

The present patent application for industrial invention relates to a system used for detecting the presence of a filter holder in a dispensing assembly of an espresso coffee machine, as well as to an espresso coffee machine provided with such a system.

A traditional coffee machine for bars comprises a water dispensing assembly that is suitable for receiving a filter holder with ground coffee.

The dispensing assembly comprises a hollow body that is internally provided with a ring with a lower circular mouth. The ring is suitable for receiving and supporting the filter holder, which is coupled with said mouth in a traditional bayonet coupling mode by means of radial tabs that are obtained in external position on the body of the filter holder and are suitable for entering and sliding inside semi-annular grooves provided inside said mouth of the dispensing assembly.

In order to insert the filter holder in the ring, firstly the filter holder must be translated from down up, in such a way to insert the filter holder in the ring, and then rotated in such a way to fix the filter holder to the ring.

As it is known, the filter holder comprises a handle used for holding and for facilitating the manual operations that are carried out by the operator every time coffee is dispensed to engage and disengage the filter holder to and from the dispensing assembly.

The body of the filter holder contains a filter that consists in a tub suitable for receiving a pressed dose of coffee powder. The bottom of the tub is provided with small holes that are suitable for retaining the coffee powder while letting the water supplied by the dispensing assembly pass through. The water impregnated with coffee aroma is filtered out of the body of the filter holder through dispensing nozzles that are obtained under the body of the filter holder.

For a correct operation of the coffee machine, the filter holder must be correctly inserted in the mouth, regardless of the operation to be carried out by the operator, such as dispensing the coffee, washing, draining, etc. In fact, if the filter holder is not inserted, an uncontrolled jet of water is ejected from the dispensing assembly.

In order to avoid such an inconvenience, which can be caused by the involuntary negligence of the operator, devices are known for automatically detecting the presence of the filter holder in the dispensing assembly. Such detection devices are in communication with a control unit of the coffee machine. The control unit of the coffee machine automatically disables the operation of the coffee machine if the control unit does not receive a signal that indicates the presence of the filter holder from said detection devices.

The detection systems of the prior art comprise optical sensors disposed in such a way to detect the presence of one or more parts of the filter holder, such as for example the body, the handle, or the dispensing nozzles.

However, this type of optical sensors has proved to be unreliable and impractical because they need to be continuously and accurately cleaned and maintained by the operator in charge of the coffee machine.

The reason of such an inconvenience is that the optical sensors need to be positioned in the work space immediately under the dispensing assembly, where water jets, vapor jets, coffee drops or coffee powder are commonly found. Moreover, in such a work space, the hands of the user must be free to operate and engage the filter holder in the mouth of the dispensing assembly, as well as to clean the work space frequently in order to remove any possible residues.

Said cleaning operations are hindered by the presence of the detection sensors that need to be protected against shocks. Furthermore, the cleaning operations need to be accurate in order to ensure the correct operation of the detection devices. In fact, the reliability of the optical detection devices is impaired if the sensor is not perfectly clean.

Additional detection systems are known, which comprise:
a mobile element that is revolvingly mounted on the ring of the dispensing assembly, externally protruding from the ring, and
a presence sensor disposed outside the ring, and suitable for cooperating with the mobile element to detect a correct insertion of the filter holder in the ring.

The filter holder is fixed to the ring in bayonet coupling mode. When the filter holder is inserted in the lower mouth of the ring with a translation from down up, the filter holder is fixed to the mobile element. When the filter holder is rotated in such a way to reach the closing position, moving the mobile element, the presence sensor detects the presence of the mobile element, indicating a correct mounting of the filter holder.

In this way, the presence of the filter holder is not detected directly when the filter holder is at the end of the rotation movement. Moreover, because of the provision of a mobile element, these detection systems are difficult to install, cumbersome, expensive to make and easy to break or damage. Consequently, the coffee machine provided with said detection systems is not reliable and has a high production and maintenance cost.

WO2016/139571 discloses a device for the introduction and block of the filter holder in coffee machines. The device is associated with a dispensing assembly of a coffee machine and with a filter holder. The device comprises a rounded body that is mounted in the dispensing assembly with possibility of sliding in vertical direction. The cylindrical body has an annular seat to receive the filter holder that is inserted only by making a horizontal translation, without any rotation movement. A sensor is mounted under the cylindrical body. The sensor comprises a "U"-shaped body that defines a groove. A radial abutment is able to be inserted in the groove of the sensor in order to be detected by the sensor. The detection system of WO2016/139571 is able to detect an insertion of the filter holder by making a horizontal translation, without any rotation movement. In fact, a rotation of the filter holder would damage the abutment and/or the sensor. So the detection system of WO2016/139571 cannot be used for filter holders that are fixed to the ring in bayonet coupling mode, which requires the filter holder to be vertically translated and rotated.

GB2487069 discloses a coffee machine comprising a cylindrical body that defines an annular seat able to receive a filter holder. A sensor comprises a plate-shaped body whereon a microswitch is mounted. The microswitch comprises a pin that is slidingly mounted in the plate-shaped body of the sensor. The pin passes through the cylindrical body of the coffee machine in such a way that one end of the pin is disposed inside the seat of the cylindrical body. The pin is stressed by a spring. When the filter holder is disposed in the seat of the cylindrical body, the filter holder pushes the pin that closes an electrical contact. Such a sensor comprising a microswitch is able to detect an insertion of the filter holder in the seat of the cylindrical body when the filter holder does not require to be rotated. For this reason, the sensor disclosed in GB2487069 cannot be used for filter holders that are fixed to the ring in bayonet coupling mode. In fact, if the microswitch sensor was used for a bayonet coupling, the microswitch sensor would detect the presence of the filter holder following to the translation of the filter holder from down up before the filter holder is rotated, thus generating an incorrect signal because the filter holder is not yet in the correct position.

The purpose of the present invention is to remedy the drawbacks of the prior art by providing a system used for detecting the filter holder that can be effectively used with filter holders coupled with a ring in bayonet coupling mode.

Another purpose is to provide a detection system that is easy to install in a coffee machine, is not cumbersome, is practical and inexpensive to make.

Another purpose is to provide a detection device that is reliable and resists to shocks and damage.

These purposes are achieved according to the invention with the characteristics of the appended independent claim 1.

Advantageous embodiments appear from the dependent claims.

The detection system of the invention is defined by claim 1.

The advantages of the detection system according to the invention are evident: because of the provision of a proximity sensor disposed in the stop point of the rotation of the filter holder in the ring, the presence of the filter holder, which is fixed to the ring in bayonet coupling mode, can be detected when the filter holder is correctly inserted in the ring.

For the sake of clarity, the description of the detection system and of the coffee machine according to the invention continues with reference to the appended drawings, which have a merely illustrative, not limiting value, wherein.

Figure 1:
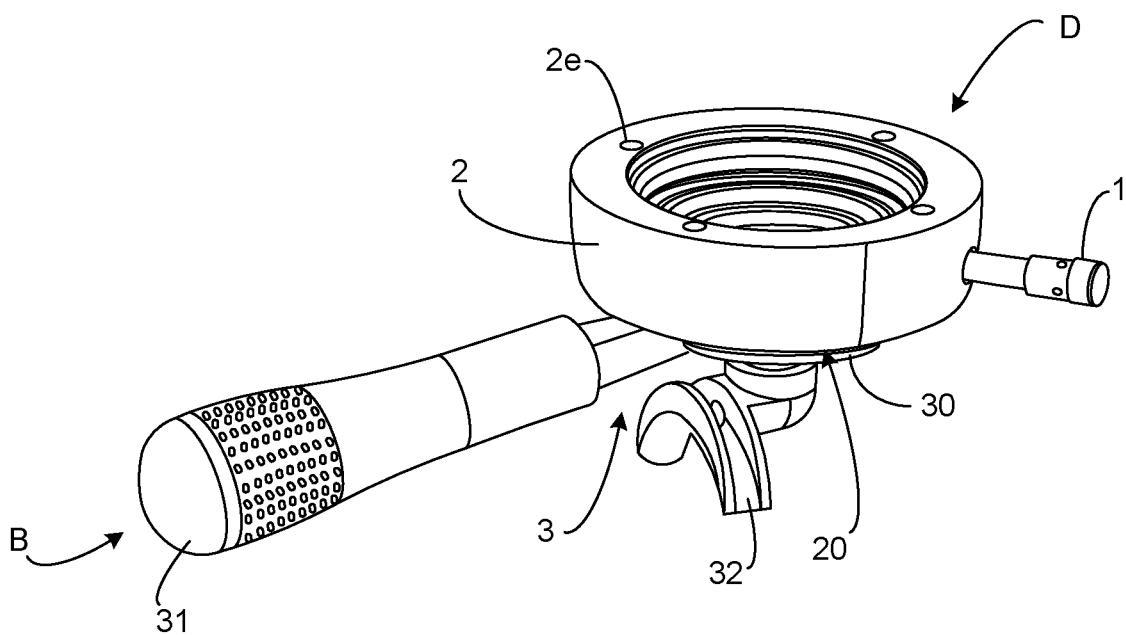
FIG. 1 is a perspective view of the detection system according to the invention, associated with a traditional filter holder of a coffee machine.
Figure 2:
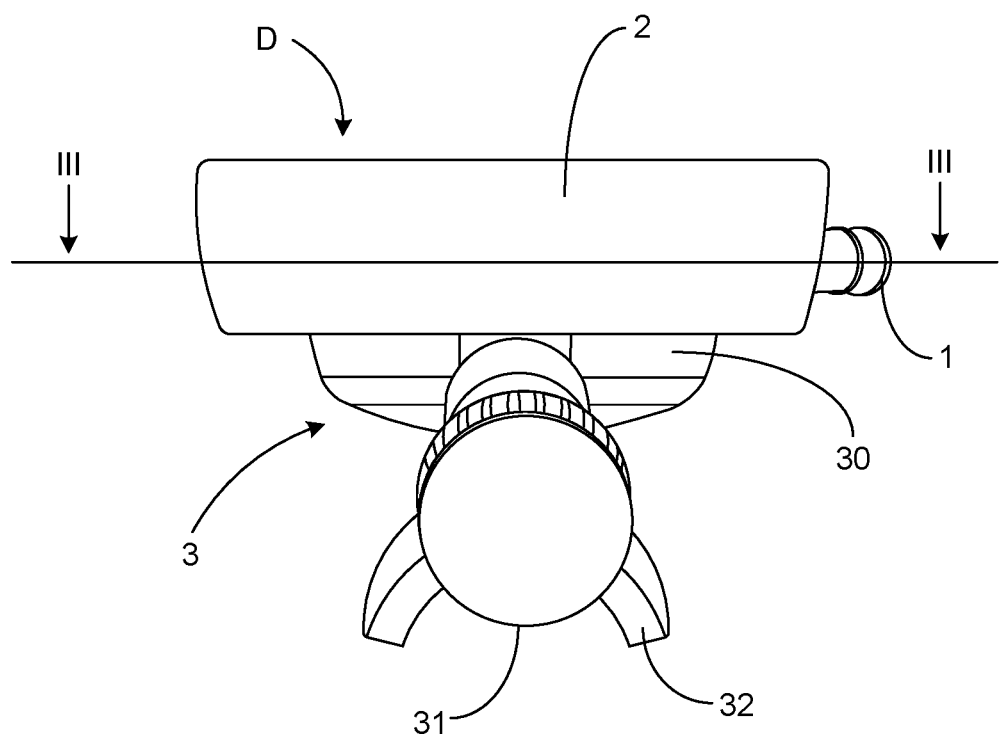
FIG. 2 is a front view of the detection system along direction B of FIG. 1.

With reference to FIGS. 1 and 2, a detection system according to the invention is disclosed, which is generally indicated with reference letter (D).

The detection system (D) is used to detect the presence of a filter holder in a dispensing assembly of a coffee machine.

The detection system (101) comprises:
- a ring (2) suitable for being connected to a dispensing assembly of a coffee machine;
- a filter holder (3) suitable for containing ground coffee and for being fixed to the ring with bayonet coupling;
- a proximity sensor (1) installed in the ring (2) in order to detect a correct fixing of the filter holder (3) to the ring (2).

The filter holder (3) comprises a cup body (30) that is externally provided with a handle (31) for holding and for facilitating the operations that must be carried out by the operator to engage and disengage the filter holder in and from the ring (2) every time the coffee is made.

The cup body (30) of the filter holder is suitable for holding the filter, which is not shown in the appended figures, falling outside the scope of the present invention. The filter contains the ground coffee. The cup body (30) of the filter holder is provided in lower position with dispensing nozzles (32), from which the water dispensed by the dispensing assembly is filtered after passing through a pod of coffee powder loaded in the filter that is housed in the cup body (30) of the filter holder.

Figure 3:
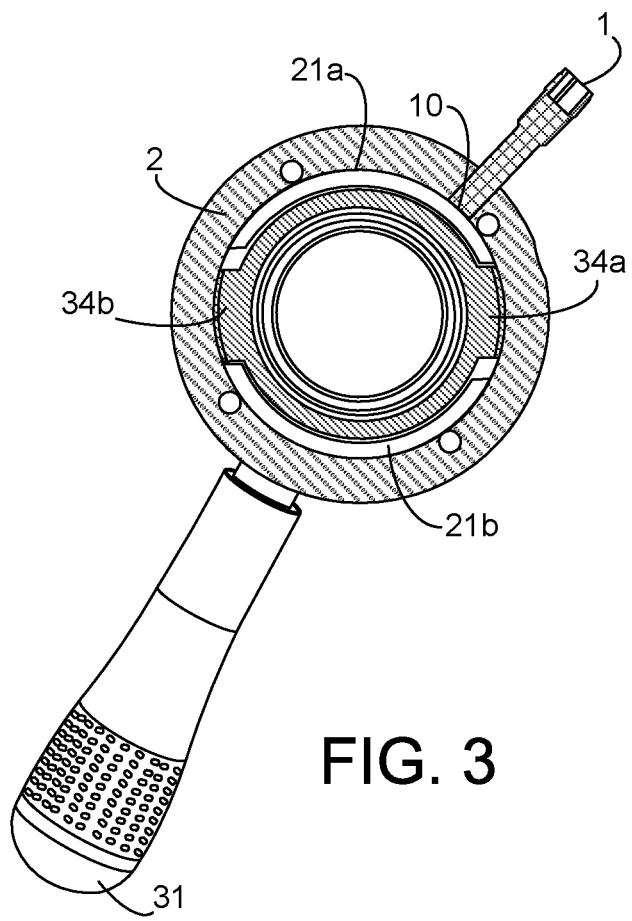
FIG. 3 is a sectional view of the detection system taken along the section plane III-III of FIG. 2, wherein the filter holder is inserted, but not fixed to the ring.
Figure 4:
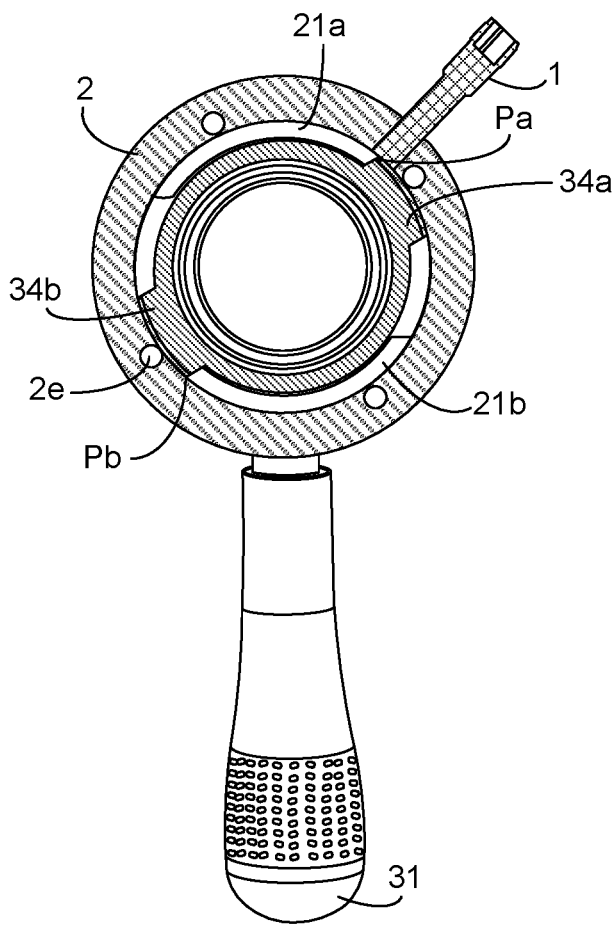
FIG. 4 is the same sectional view as FIG. 3, except for the fact that the filter holder is correctly fixed to the ring.

With reference to FIGS. 3 and 4, the filter holder (3) comprises a first tab and a second tab (34a, 34b) that protrude radially outwards from the cup body (30). The tabs (34a, 34b) of the filter holder are suitable for fixing the filter holder (3) to the ring (2).

The ring (2) defines a compartment that can be accessed in its lower portion by means of a mouth (20) that allows for inserting the cup body (30) in the compartment of the ring. The ring (2) comprises a first groove and a second groove (21a, 21b) with semi-annular shape, which are obtained in an internal surface of the ring. The tabs (34a, 34b) of the filter holder are suitable for being coupled and for sliding in the semi-annular grooves (21a, 21b) of the ring, as shown in FIGS. 3 and 4; the grooves (21a, 21b) of the ring (2) are configured in such a way to receive the tabs (34a, 34b) of the filter holder in bayonet coupling mode.

In order to insert the filter holder (3) in the ring (2), the filter holder (3) must be translated from down up, in such a way to insert the cup body (30) and the tabs (34a, 34b) of the filter holder in the compartment of the ring, passing through the mouth (20) of the ring. Then, the filter holder (3) must be rotated around the axis of the ring (2) in such a way that the tabs (34a, 34b) of the filter holder can slide in the semi-annular grooves (21a, 21b) of the ring until the stop points (Pa, Pb), wherein the filter holder (3) is correctly fixed to the ring (2). Generally, the filter holder is rotated by approximately 30-45°.

Figure 6:
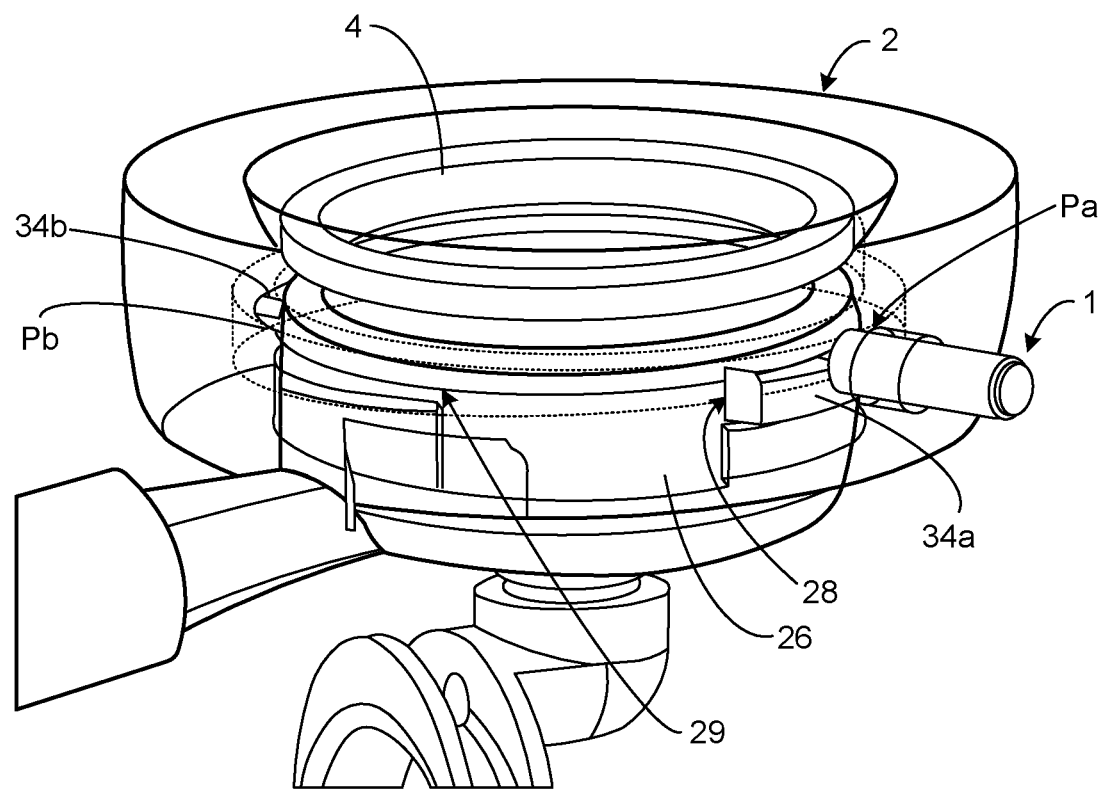
FIG. 6 is the same rendering as FIG. 5, except for the fact that the filter holder is correctly fixed to the ring.

With reference to FIG. 6, when the rotation of the filter holder (3) is completed, an upper edge of the cup body (30) of the filter holder is pressed against a seal (4) in order to provide a tight seal during the dispensing of hot water. The seal (4) can be mounted in the ring (3) or in the dispensing assembly.

Figure 5:
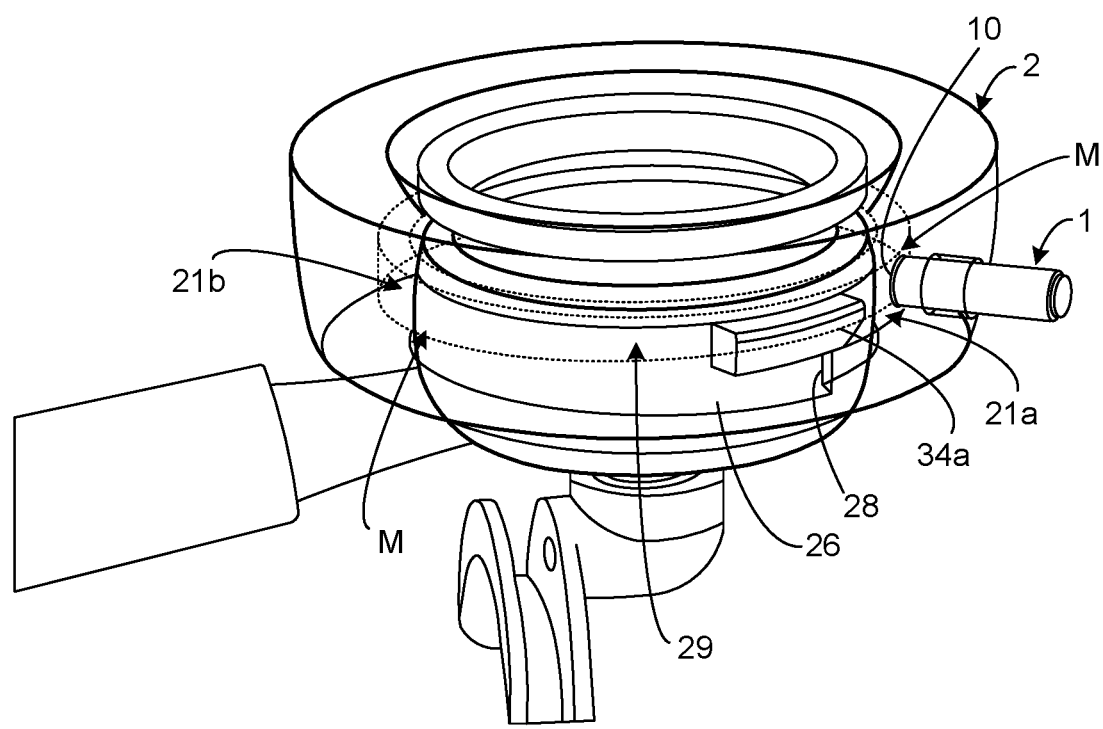
FIG. 5 is a rendering of the detection system according to the invention, wherein the ring is shown in transparency and the filter holder is inserted, but not fixed to the ring.

FIGS. 3 and 5 show the filter holder (3) in the compartment of the ring (2) after the translation from down up of the filter holder.

FIGS. 4 and 6 show the filter holder (3) correctly fixed to the ring (2) after the rotation of the filter holder in the ring.

With reference to FIGS. 5 and 6, each semi-annular groove (21a, 21b) of the ring comprises a first end (28) and a second end (29). The first end (28) of each groove communicates with a corresponding recessed housing (26) obtained on the internal surface of the ring. The two recessed housings (26) are disposed in diametral opposite positions and open on the bottom in order to permit the insertion of the two tabs (34a, 34b) in the compartment of the ring (2) after the translation from down up of the filter holder. When the filter holder rotates, the tabs (34a, 34b) are inserted into the grooves (21a, 21b) passing through the first end (28) of each groove, and slide in the grooves (21a, 21b) towards the second end (29) of each groove.

The ring (2) comprises translation stop means suitable for stopping the translation of the filter holder from down up, as well as rotation stop means (M) suitable for stopping the rotation of the filter holder (3) in the ring (2) in the stop point (Pa) of the sliding of the tab (34a) of the filter holder in the groove (21a) of the ring.

The translation stop means advantageously consist in stops that define in upper position the recessed housings (26) of the ring that are in communication with the grooves (21a, 21b).

With reference to FIGS. 5 and 6, the rotation stop means (M) advantageously consist in a narrowing of the grooves (21a, 21b), that is to say in a reduction of the distance between an upper wall and a lower wall that define the grooves. The narrowing of each groove has a lower width than a thickness of the corresponding tab (34a, 34b) in such a way to stop the tab.

The two narrowing points, which are disposed inside one of the two semi-annular grooves, coincide with the two stop points (Pa, Pb) of the rotation of the filter holder (3). When the filter holder (3) rotates in such a way that the tabs (34a, 34b) reach the stop points (Pa, Pb), the filter holder (3) is correctly and firmly fixed to the ring (2).

The rotation stop means (M) may consist in the narrowing of only one semi-annular groove or may comprise a stop against which one of the tabs of the filter holder is engaged.

With reference to FIGS. 3 and 4, the proximity sensor (1) is radially housed in the body of the ring (2). The proximity sensor (1) radially passes through the entire body of the ring. The proximity sensor (1) has one sensitive end (10). The sensitive end (10) of the proximity sensor finishes in the first semi-annular groove (21a) of the ring, in correspondence of the stop point (Pa) of the first groove, in such a way that the sensitive end (10) of the proximity sensor (1) can detect the presence of the first tab (34a) of the filter holder in the stop point (Pa) of the first semi-annular groove of the ring. Therefore, the proximity sensor (1) detects the presence of the first tab (24a) of the filter holder only when the rotation of the filter holder (3) in the ring (2) is completed, i.e. when the filter holder (3) is correctly and firmly fixed to the ring (2).

Alternatively, the proximity sensor (1) can be disposed in such a way that the sensitive end (10) of the proximity sensor finishes in the stop point (Pb) of the second semi-annular groove (21b) of the ring in order to detect the presence of the second tab (24b) of the filter holder.

The detection system may also comprise two proximity sensors disposed in such a way that the sensitive ends of the two proximity sensors finish in the stop points (Pa, Pb) of the first and of the second groove (21a, 21b), respectively.

According to the preferred embodiment of the invention, the sensitive end (10) of the proximity sensor (1) is flush to a wall that defines the groove, without projecting, as shown in FIGS. 3 and 4.

Said proximity sensor (1) may be electromechanical, inductive, capacitive or of any other type, as long as it is suitable for generating a detection signal every time it detects the presence of the tab (34a) of the filter holder in the stop point (Pa) of the semi-annular groove of the ring.

Therefore, because of the provision of the proximity sensor in the stop point of the semi-annular groove of the ring, the presence of the filter holder coupled with the ring in bayonet coupling mode is detected when the filter holder is correctly fixed to the ring, that is to say at the end of the rotation of the filter holder with respect to the ring.

Moreover, the detection system (D) has no moving parts, and is therefore easy to install, not cumbersome, inexpensive to make and reliable.

The present invention also relates to a coffee machine provided with the detection system (D).

The coffee machine comprises:
an electrical system,
a water system to produce pressurized hot water,
a hot water dispensing assembly,
a control unit connected to the electrical system, to the water system and to the dispensing assembly in order to control and manage the operation of the coffee machine.

The ring (2) of the detection system (D) is housed inside the dispensing assembly of the espresso coffee machine.

According to the preferred embodiment of the invention, the support ring (2) is fixed inside the dispensing assembly of the coffee machine by means of screws inserted through corresponding holes (2e) obtained in the support ring (2) and suitable for being screwed inside threaded holes obtained on the body of the dispensing assembly.

According to a different embodiment, said ring (2) is integral with the body of the dispensing assembly.

The proximity sensor (1) of the detection system (D) is electrically connected to the control unit of the coffee machine in order to send a piece of information to the control unit on the presence of the tab (34a) of the filter holder in the stop point (Pa) of the semi-annular groove of the ring. Otherwise said, the proximity sensor (1) sends an ON signal to the control unit to indicate a correct position of the filter holder, and an OFF signal to indicate an incorrect position of the filter holder.

Said ON and OFF signals received by the control unit can be used to enable or disable several functions of the coffee machine.

The control unit will not enable some operating steps of the coffee machine, such as the dispensing of coffee or the washing of the filter holder, until it receives the ON signal generated by the proximity sensor (1) of the detection system (D). Otherwise said, if the user begins to dispense the coffee or wash the filter holder, these steps will not start (i.e. they are disabled) until the control unit receives the ON signal from the proximity sensor.

When the control unit detects a transition of the signal from ON to OFF from the proximity sensor, the control unit considers that the filter holder has just been removed, so the control unit starts the automatic washing of the dispensing assembly, wherein the water system sends a small quantity of pressurized water in the dispensing assembly in order to remove the coffee residues left by the filter holder when previously dispensing the coffee.

The coffee machine advantageously comprises an acoustic and/or visual alarm connected to the control unit. The control unit is configured in such a way to activate said acoustic and/or visual alarm when a user activates the dispensing of water from the dispensing assembly and the proximity sensor (1) of the detection system (D) does not detect a correct position of the filter holder in the ring.

Although not shown in the figures, the filter holder (3) may comprise only one tab or more than two tabs. In such a case, the ring (2) comprises as many semi-annular grooves as the tabs of the filter holder.

The invention claimed is:

1. A system for detecting a presence of a filter holder in a dispensing assembly of a coffee machine, the system comprising:
a ring adapted to be connected to the dispensing assembly of the coffee machine, said ring having a compartment accessible at a lower position by a mouth, said ring having at least one groove formed in an internal surface thereof;
the filter holder adapted to contain around coffee, the filter holder having at least one tab coupled to the at least one groove of said ring; and a proximity sensor positioned so as to detect the presence of the filter holder in said ring, wherein the at least one groove of said ring has a semi-annular shape and receives the at least one tab of the filter holder in a bayonet coupling manner, the filter holder being translatable upwardly so as to allow the at least one tab of the filter holder to enter the compartment of said ring and rotate around an axis of said ring such that the at least one tab of the filter holder slides in the at least one groove of said ring, said ring having a rotation stop adapted to stop the rotation of the filter holder in the ring at a stop point of a sliding movement of the at least one tab of the filter holder in the at least one groove of said ring during the rotation of the filter holder, wherein said proximity sensor is housed in said ring so as to have a sensitive end corresponding to the stop point of the at least one groove of said ring such that the sensitive end of said proximity sensor detects a presence of the at least one tab of the filter holder in the stop point of the at least one groove of said ring, wherein said ring has a translation stop adapted to stop the upward translation of the lifter holder, wherein the at least one groove has a first end in communication with a recessed housing foil led in the internal surface of said ring, the at least one groove being open at a bottom thereof so as to receive the at least one tab in the compartment of said ring after the upward translation of the filter holder, the translation stop defining the recessed housing of said ring in an upper position.

2. The system of claim 1, wherein the tab has a thickness, the rotation stop being a narrowing of the at least one groove of said ring, the narrowing having a width less than the thickness of the tab.

3. The system of claim 1, wherein the rotation stop is disposed in the at least one groove of said ring against which the tab of the filter holder is engaged.

4. The system of claim 1, wherein said proximity sensor is disposed in a radial direction relative to said ring.

5. The system of claim 1, wherein the sensitive end to the proximity sensor is flush with a wall defining the at least one groove.

6. The system of claim 1, wherein said proximity sensor is an electromagnetic sensor.

7. The system of claim 1, wherein said proximity sensor is an inductive sensor.

8. The system of claim 1, wherein said proximity sensor is a capacitive sensor.

9. A coffee machine comprising:
an electrical system;
a water system adapted to produce pressurized hot water;
a hot water dispensing assembly;
a control unit connected to said electrical system and to said water system and to said hot water dispensing assembly so as to control and manage an operation of the coffee machine; and
a detection system comprising:
  a ring adapted to be connected to the dispensing assembly of the coffee machine, said ring having a compartment accessible at a lower position by a mouth, said ring having at least one groove formed in an internal surface thereof;
  a filter holder adapted to contain ground coffee, the filter holder having at least one tab coupled to the at least one groove of said ring; and
  a proximity sensor positioned so as to detect the presence of the filter holder in said ring, wherein the at least one groove of said ring has a semi-annular shape and receives the at least one tab of the filter holder in a bayonet coupling manner, the filter holder being translatable upwardly so as to allow the at least one tab of the filter holder to enter the compartment of said ring and rotate around an axis of said ring such that the at least one tab of the filter holder slides in the at least one groove of said ring, said ring having a rotation stop adapted to stop the rotation of the filter holder in the ring at a stop point of a sliding movement of the at least one tab of the filter holder in the at least one groove of said ring during the rotation of the filter holder, wherein said proximity sensor is housed in said ring so as to have a sensitive end corresponding to the stop point of the at least one groove of said ring such that the sensitive end of said proximity sensor detects a presence of the at least one tab of the filter holder in the stop point of the at least one groove of said ring, wherein said ring is housed in said hot water dispensing assembly and said proximity sensor is electrically connected to said control unit so as to send a piece of information to said control unit as to the presence of the at least one tab of the filter holder in the stop point of the at least one groove of said ring, wherein said proximity sensor is adapted to send an ON signal to said control unit so as to indicate a correct position of the filter holder and an OFF signal to indicate an incorrect position of the filter holder, the ON signal and the OFF signal that are received by said control unit enabling or disabling a function of the coffee machine, wherein said control unit is configured to cause an automatic washing of said hot water dispensing assembly when said control unit detects a transition of the ON signal to the OFF signal from said proximity sensor, wherein said water system sends a quantity of pressurized water to said hot water dispensing assembly during the automatic washing in order to remove coffee residue from the filter holder when coffee is previous dispensed.

10. The coffee machine of claim 9, wherein said control unit is configured to disable an operating step of the coffee machine until said control unit receives the ON signal from the proximity sensor of said detector system, the operating step being dispensing of the coffee or washing of the filter holder.

11. The coffee machine of claim 9, further comprising:
an acoustic alarm connected to said control unit, said control unit configured to activate said acoustic alarm when a user dispenses hot water from said hot water dispensing assembly and when said proximity sensor does not detect a correct position of the filter holder in said ring.

12. The coffee machine of claim 9, further comprising:
a visual alarm is connected to said control unit, said control unit configured to activate said visual alarm when a user dispenses hot water from said hot water dispensing assembly and when said proximity sensor does not detect a correct position of the filter holder in said ring.

* * * * *